US010148999B2

(12) United States Patent
Hicks et al.

(10) Patent No.: US 10,148,999 B2
(45) Date of Patent: Dec. 4, 2018

(54) AUTOMATIC SENSING RF COMBINER

(71) Applicant: Steiner Enterprises, Lafayette, IN (US)

(72) Inventors: Thomas P. Hicks, Lafayette, IN (US);
Donald E. DeWitt, Syracuse, IN (US);
Joshua E. DeWitt, Westfield, IN (US);
Wade M. Seaburg, Lafayette, IN (US)

(73) Assignee: Steiner Enterprises, Lafayette, IN (US)

( * ) Notice: Subject to any disclaimer, the term of this patent is extended or adjusted under 35 U.S.C. 154(b) by 0 days.

(21) Appl. No.: 15/848,740

(22) Filed: Dec. 20, 2017

(65) Prior Publication Data

US 2018/0176627 A1 Jun. 21, 2018

Related U.S. Application Data

(60) Provisional application No. 62/436,728, filed on Dec. 20, 2016, provisional application No. 62/438,720, filed on Dec. 23, 2016.

(51) Int. Cl.
*H04N 21/426* (2011.01)
*H04B 1/18* (2006.01)
(Continued)

(52) U.S. Cl.
CPC ......... *H04N 21/42607* (2013.01); *H04B 1/18* (2013.01); *H04N 21/41422* (2013.01);
(Continued)

(58) Field of Classification Search
CPC .................................................. H04N 21/4104
See application file for complete search history.

(56) References Cited

U.S. PATENT DOCUMENTS

| 4,686,564 A * | 8/1987 | Masuko | ............. H04N 7/17354 |
| | | | 348/E7.075 |
| 4,724,478 A * | 2/1988 | Masuko | ............... G08B 25/085 |
| | | | 348/E7.075 |

(Continued)

OTHER PUBLICATIONS

Leviton Voice & Data Divsion instructions for use for the 3/4 Multi-Switch (1 page).

(Continued)

*Primary Examiner* — Paulos M Natnael
(74) *Attorney, Agent, or Firm* — Maginot, Moore & Beck, LLP

(57) ABSTRACT

An automatic RF combiner receives signals from an over-the-air antenna, a cable television signal source and at least one satellite antenna, and combines the signals for output to one or more television receivers. The combiner includes a first signal combiner connected to the input for the over-the-air antenna and the cable television signal source and providing an output signal. The output from the first signal combiner is supplied to a second signal combiner together with signal at the input for the at least one satellite antenna. A switch or filter is connected between the input for the over-the-air antenna and the first signal combiner, and a logic controller is connected between the input for the cable television signal source and the switch or filter that is configured and operable to open the switch or activate the filter when a signal is detected at the input for the cable television signal source, and to close the switch or deactivate the filter when no signal is detected, thereby controlling whether the over-the-air signal passes to the first signal combiner.

10 Claims, 4 Drawing Sheets

(51) Int. Cl.
*H04N 21/462* (2011.01)
*H04N 21/414* (2011.01)
*H04N 21/61* (2011.01)

(52) U.S. Cl.
CPC ..... *H04N 21/4622* (2013.01); *H04N 21/6112* (2013.01); *H04N 21/6118* (2013.01); *H04N 21/6143* (2013.01)

(56) References Cited

U.S. PATENT DOCUMENTS

| | | | | |
|---|---|---|---|---|
| 5,887,243 A | * | 3/1999 | Harvey | G01R 1/071 |
| | | | | 725/136 |
| 5,959,592 A | * | 9/1999 | Petruzzelli | H01Q 1/247 |
| | | | | 343/756 |
| 6,177,963 B1 | * | 1/2001 | Foye | H04N 5/775 |
| | | | | 330/100 |
| 6,526,576 B1 | * | 2/2003 | Kwoh | H04N 5/44543 |
| | | | | 348/E5.105 |
| 7,092,043 B2 | * | 8/2006 | Vorenkamp | H01F 17/0006 |
| | | | | 257/E27.046 |
| 7,653,152 B2 | * | 1/2010 | Al-Eidan | H04L 27/12 |
| | | | | 329/315 |
| 7,769,344 B1 | * | 8/2010 | Harvey | G06Q 30/0251 |
| | | | | 345/629 |
| 7,945,225 B2 | * | 5/2011 | Small | H04H 20/30 |
| | | | | 455/137 |
| 8,688,045 B2 | * | 4/2014 | Lin | H04B 1/525 |
| | | | | 330/294 |
| 2003/0084448 A1 | * | 5/2003 | Soundararajan | H04N 21/443 |
| | | | | 725/46 |
| 2003/0200548 A1 | * | 10/2003 | Baran | H04L 29/06027 |
| | | | | 725/90 |
| 2015/0382049 A1 | * | 12/2015 | Fujii | H04N 5/4401 |
| | | | | 348/706 |
| 2018/0176627 A1 | * | 6/2018 | Hicks | H04N 21/42607 |

OTHER PUBLICATIONS

Dish Pro Hybrid 42 Switch Installation Guide (14 pages).

Dish Pro Plus 44 Multi-Dish Switch Installation Guide (24 pages).

\* cited by examiner

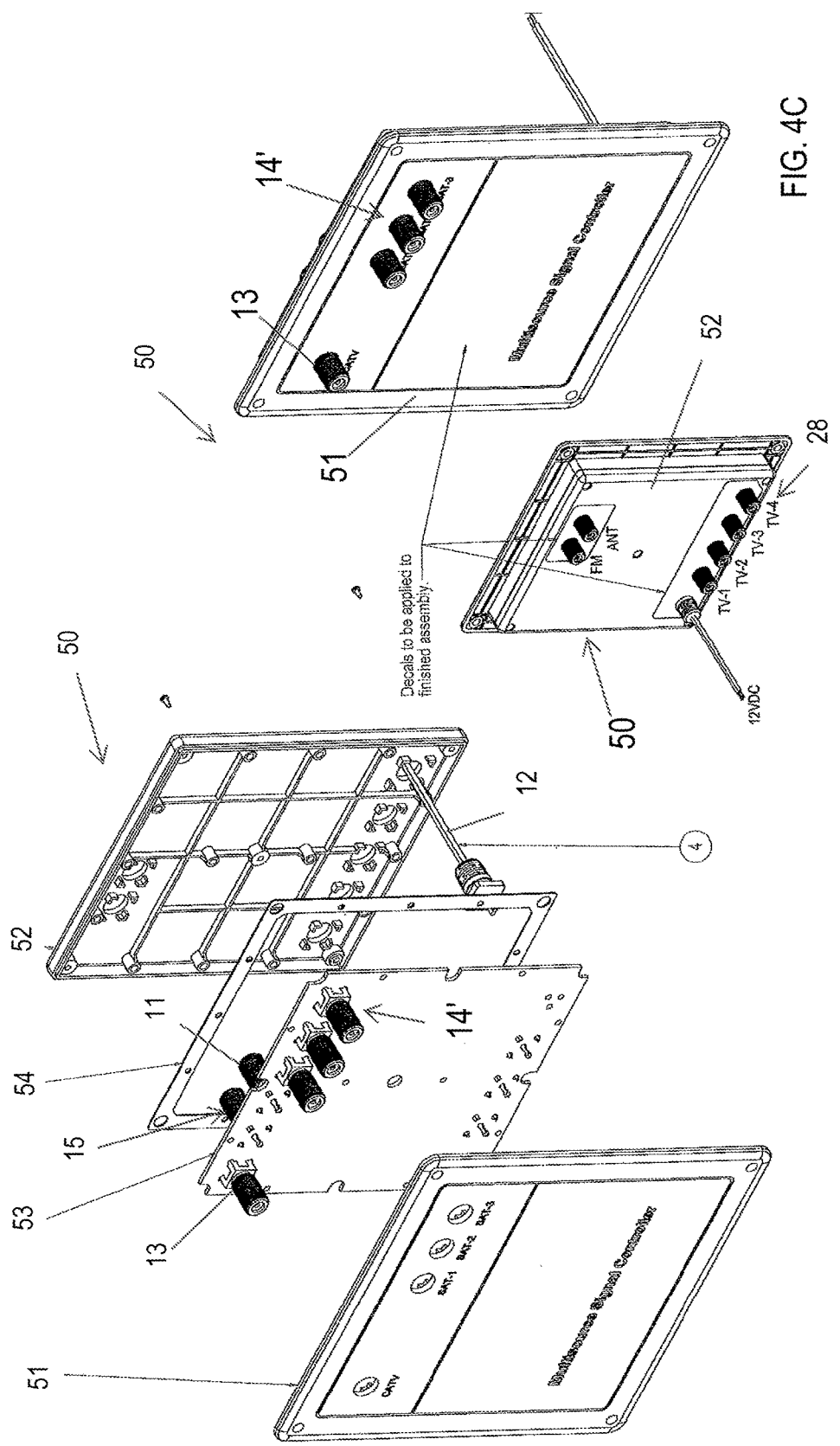

AUTOMATIC SENSING RF COMBINER

REFERENCE TO RELATED APPLICATIONS

This application is a utility filing from and claims priority to U.S. Provisional Application No. 62/436,728 entitled "Automatic Sensing RF Combiner/Selector/Multiswitch", filed on Dec. 20, 2016, and to U.S. Provisional Application No. 62/438,720 entitled "Automatic Sensing RF Combiner/Selector", also filed on Dec. 20, 2016. The disclosures of both provisionals are incorporated herein by reference.

BACKGROUND

Television has been ubiquitous and was made even more widespread with the advent of satellite TV. Satellite TV made television available to homes that were too remote to receive standard over-the-air UHF/VHF signals. With the development of $K_u$ band frequency satellites, the smaller antenna dish requirements led to an even greater proliferation of televisions. The smaller dish meant that the dish could be mounted on a vehicle, such as a recreational vehicle, camper or boat, and even transported to a remote camping site. The development of the low-noise block downconverter (LNB converter) advanced the remote TV market even further.

A satellite antenna is now standard equipment on RVs, boats and campers. However, modern RVers are not limited to only satellite TV to satisfy their entertainment needs. Most vehicles equipped with a television are capable of receiving not only satellite or dish TV signals, but also the legacy UHF/VHF television signals, as well as cable TV signals. RV parks are routinely equipped with cable TV hook ups. The mobile television viewer can select TV from a multitude of sources. However, this broad selection is not without a price. All of these signals converge to the same television(s) or converter box. Many of these signals can interfere with each other if received simultaneously, cancelling each other out and leaving the viewer with a blank screen. Cable TV and over-the-air TV frequently offer the same channels and channel frequencies. When a channel is selected by the viewer the chosen channel is fed by both the cable TV and over-the-air TV source, which disrupts the channel tuning and again results in a blank screen. This potential for signal conflict is aggravated by the ability to receive multiple signals from satellites directed to different regions of the sky.

At present, this potential for conflict is addressed by a separate hard-switch that selects either the cable or the over-the-air signal to be passed to the television(s). In some cases, the hard switch is somewhere within the vehicle, but typically remote from the television, such as in the glove box of an RV. In other cases, the hard switch is on the outside of the facility or vehicle. In either case, the need to manually change incoming TV signal with a hard switch ranges from an aggravation to a danger, such as when an elderly viewer must manage an outdoor switch.

There is a need to manage and distribute TV signals from this multitude of sources to the viewer's television(s) economically while maintaining signal integrity.

SUMMARY

An automatic RF combiner receives signals from an over-the-air antenna, a cable television signal source and at least one satellite antenna, and combines the signals for output to one or more television receivers. The combiner includes a printed circuit board that incorporates an amplifier connected to the input for each of the signals and a first signal combiner connected to the input for the over-the-air antenna and the cable television signal source and providing an output signal. The output from the first signal combiner is supplied to a second signal combiner together with the signal at the input for the at least one satellite antenna. The output from the second signal combiner is provided to a multi-switch or splitter for providing the signal to the one or more television receivers.

In one aspect of the present disclosure, the printed circuit board further includes a signal processor, which can be a switch or a filter, connected between the input for the over-the-air antenna and the first signal combiner, and a logic controller connected between the input for the cable television signal source and the signal processor. The logic controller is configured and operable to open the switch or activate the filter when a signal is detected at the input for the cable television signal source, and to close the switch or deactivate the filter when no signal is detected at the input for the cable television signal source, thereby controlling whether the over-the-air signal passes to the first signal combiner.

DESCRIPTION OF THE DRAWINGS

FIG. 4A, 4B, 4C are exploded, back perspective and front perspective views of an automatic sensing RF combiner module incorporating the combiner shown in FIG. 2.

DETAILED DESCRIPTION

Figure 1:
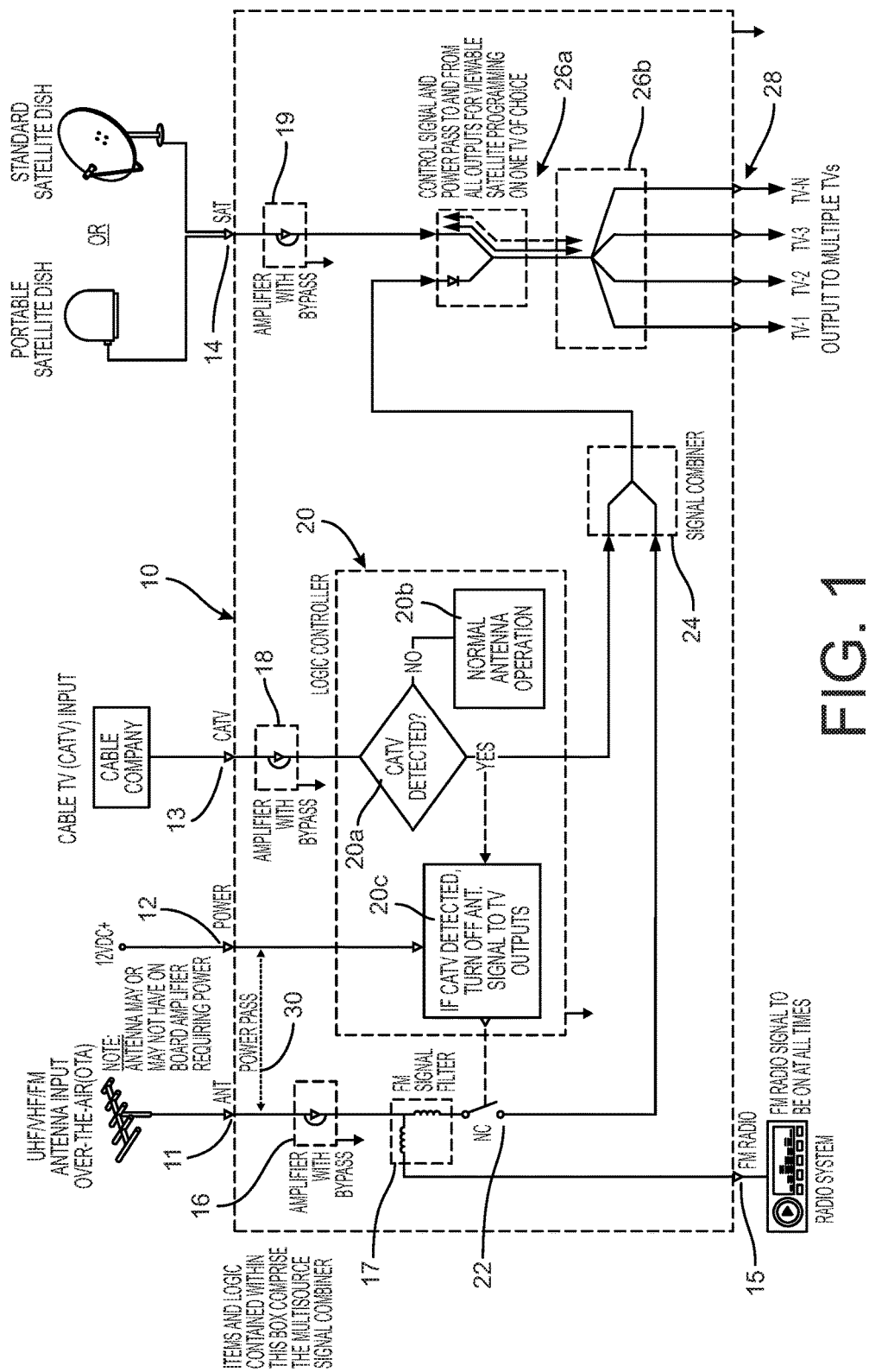
FIG. 1 is a schematic of an automatic sensing RF combiner according to one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

An automatic sensing RF combiner 10 is shown in the schematic of FIG. 1. The combiner 10 includes inputs for over-the-air antenna 11, power 12, cable TV 13 and satellite TV 14. The television signals may each pass through a respective amplifier 16, 18 and 19 if needed to enhance the incoming signal. Any of the amplifiers may include a bypass option as desired. The over-the-air input—which can include UHF, VHF and FM frequencies—is fed through an FM signal filter 17 so that the FM signal can pass to the output 15 that is configured for connection to an FM receiver. In the illustrated embodiment, the FM signal received at input 11 always passes to the output 15, but the FM signal filter 17 prevents the FM signal from being conveyed with the other over-the-air signals (i.e., UHF, VHF).

In one feature of the present disclosure, the combiner 10 includes a logic controller 20 that is operable to control a signal processor 22 coupled to the output of the FM signal filter 17. In one embodiment, the signal processor 22 can be a switch that is operable in its "on" state to pass the over-the-air signal received at input 11 to a signal combiner 24. The signal combiner 24 also receives the cable TV signal provided at input 13 but provides a single output signal to the downstream components of the RF combiner 10. As discussed above, simultaneous reception of the over-the-air and the cable TV signals can result in a conflict, disrupting television reception for the viewer. The logic controller 20 is thus configured to prevent this conflict by controlling the signal processor 22. Thus, the logic controller first determines in step 20a whether a cable TV signal at input 13 has been detected. If there is no cable TV signal, in step 20b the controller directs the signal processor 22 to permit the over-the-air TV signal to pass to the combiner 24, and ultimately to the viewer's television(s). In the disclosed embodiment, the switch is closed to pass the over-the-air TV signal. On the other hand, if a cable TV signal is detected, in step 20c the controller directs the signal processor 22 to operate on the over-the-air signal before it reaches the combiner 24. In the illustrated embodiment, this step entails opening the switch so that no UHF or VHF signal passes to the combiner 24. In one aspect, the switch position can be normally passive.

In accordance with the present disclosure, the term "logic controller" includes hardware, firmware, discrete logic and software components, or a combination thereof, capable of performing the steps 20a-20c. It is further understood that the term "switch" can encompass different hardware, firmware and software components that are capable of controlling the passage of the signal received at input 11 to the first combiner 24. For instance, the switch embodying the signal processor 22 can be a micro-switch that is activated by a signal from the logic controller 20 or a transistor in which the logic controller controls the base drive current. In other embodiments, the signal processor 22 can be a filter that filters the particular frequency(ies) of the over-the-air signal upon actuation by the logic controller.

The signal from the signal combiner 24 is either an over-the-air signal from inputs 11, 15 or a cable TV signal from input 13. The output of the signal combiner 24 is fed to a second combiner 26a, together with the signal from the satellite TV input 14. Since the satellite TV signal is at a different frequency from the cable TV or over-the-air signals there is no risk of conflict. Consequently, the two signals can be fed directly to the second combiner 26a which then provides a single output to a splitter 26b, leaving it to the television receivers and/or converter box to discern which signal is received by which television 28. The splitter 26b can be configured as a conventional splitter capable of dividing the TV signal from the second combiner 26a among one or more televisions at the input 28.

In a further feature of the combiner 10, a power pass line 30 is provided between the power input 12 and the over-the-air antenna input 11. This power pass line 30 can provide electrical power to the antenna so that a separate antenna power supply is not required. As is conventional, the power input can be a 12 VDC input.

Figure 2:
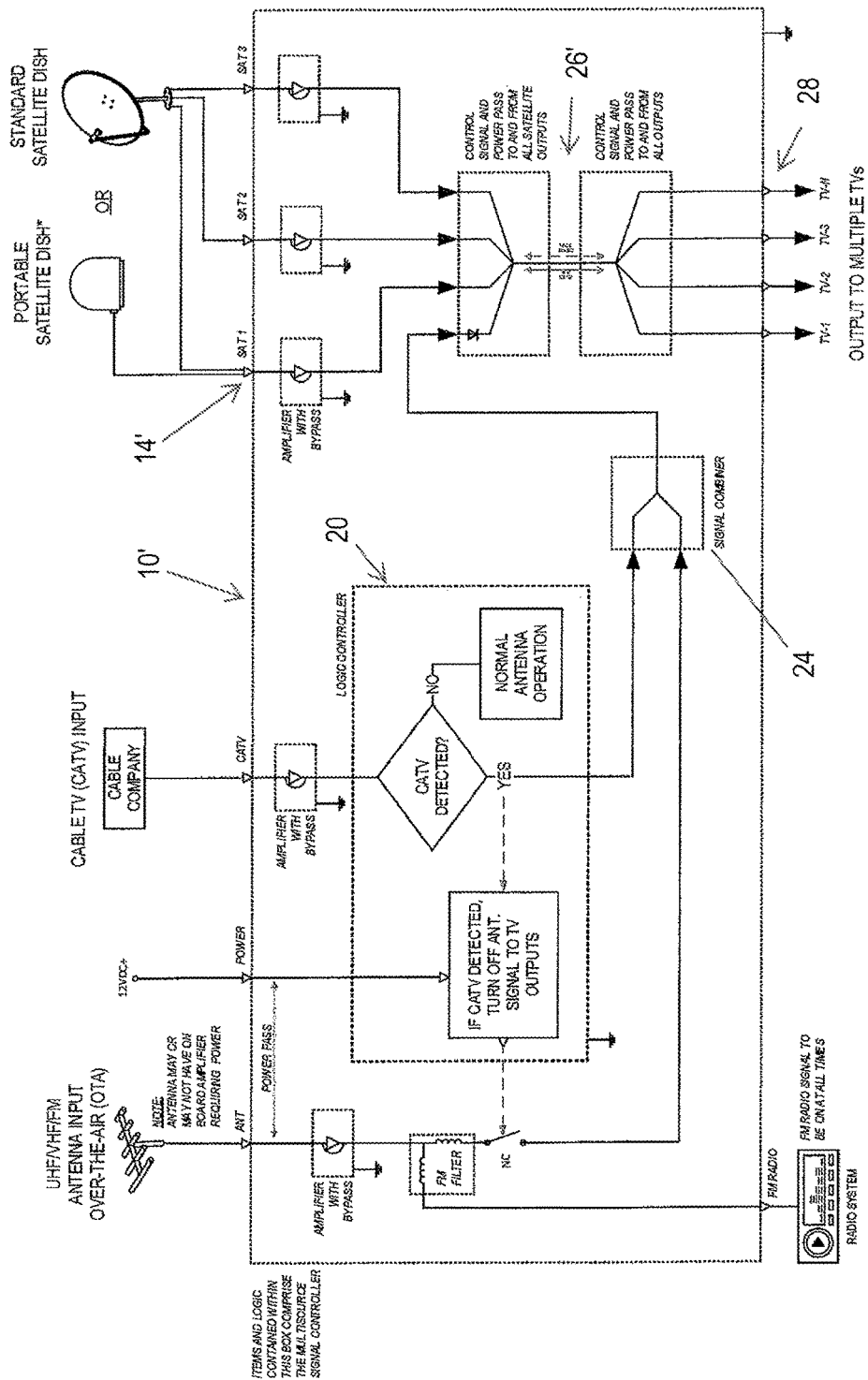
FIG. 2 is a schematic of an automatic sensing RF combiner according to another embodiment of the present disclosure.

In the embodiment of FIG. 1, the satellite TV input 14 is connected to a single dish, whether it is a standard satellite dish or a portable dome dish. In the embodiment shown in the schematic of FIG. 2, a modified combiner 10' includes a satellite input 14' for receiving multiple satellite antenna signals from three different satellites. In many applications, a viewer will have multiple satellite receivers pointing to different satellites in the sky. The combiner 10' of FIG. 2 accommodates the multiple satellite viewer. The combiner multi-switch 26' is also modified to accept the multiple satellite signals together with the output from the signal combiner 24. It can be appreciated that the circuitry of the combiner 10' upstream of the combiner multi-switch 26'. Thus, the combiner 10' includes the logic controller 20 described above.

Figure 3:
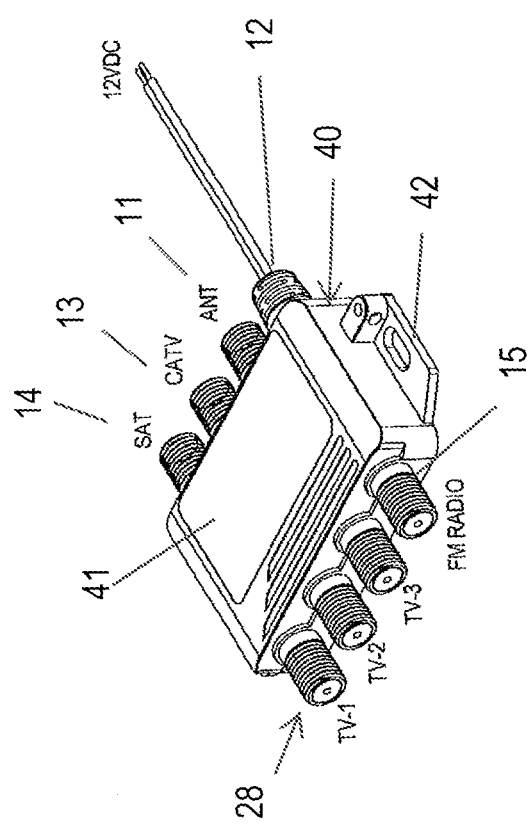
FIG. 3 is a perspective view of an automatic sensing RF combiner module incorporating the combiner shown in FIG. 1.

FIGS. 3 and 4 show the combiner modules that can be mounted within a vehicle or building. The module 40 shown in FIG. 3 incorporates the automatic sensing RF combiner shown in the schematic of FIG. 1. Thus, the module 40 includes a housing 41 with a mounting bracket 42 for optionally fastening the module to the vehicle or building. The module includes conventional coaxial connectors to be coupled to the appropriate antenna output connector. The module 50 shown in FIGS. 4A-4C incorporates the combiner 10' shown in the schematic of FIG. 2, hence the multiple satellite inputs 14'. As shown in FIG. 4A, the module 50 includes a front plate 51 and back plate 52 that houses a printed circuit board 53 and gasket 54. The printed circuit board 53 includes circuitry embodying the electrical components in the schematic of FIG. 2, namely the amplifiers 16, 18, 19, filter 17, switch 22, logic controller 20, signal combiner 24, multi-switch 26' and power pass line 30. The module 40 also houses a comparable printed circuit board with the electrical components shown in the schematic of FIG. 1. Either module 40, 50 can be readily mounted within a vehicle in proximity to the inputs or to the television receiver(s)/converter box(es).

In one embodiment, the logic controller 20 is configured to simply detect the presence of a cable TV signal at input 13. In many instances, an RV owner will only use the over-the-air antenna when a cable TV input is not available. In that instance, no CATV signal would be received at input 13, so logic controller 20 will not detect a CATV signal in step 20a. However, in other instances, the RV owner may have both inputs 11, 13 of the combiner 10, 10' active, namely with an over-the-air antenna and a cable TV connection. In that instance, the logic controller 20 can be configured to compare the signal strengths of the two competing input signals. Thus, step 20a can be modified to compare the incoming signals at the over-the-air input 11 and the CATV input 13 to corresponding thresholds. The threshold values can correspond to signal strength for the respective over-the-air and CATV signals. The "no" condition for modified step 20a can be satisfied if the CATV input signal falls below its respective threshold, in which case the signal processor 22 is operable to allow the over-the-air signal to pass to the combiner 24 (i.e., the switch in the disclosed embodiment is closed). The "yes" condition of step 20a can be satisfied if the CATV input signal is above its associated threshold, or if the over-the-air input signal is below its associated threshold, in which case the signal processor 22 operates on the signal before it reaches the combiner (i.e., the switch in the disclosed embodiment is opened).

As a further alternative, the logic controller 20 can be modified to attenuate the incoming over-the-air signal in step 20c. In this modification, the signal processor 22 is a signal attenuator that is activated by the logic controller 20 based on the conditions discussed above. The attenuator is configured to reduce the signal strength of the over-the-air signal to a level that does not interfere with the cable TV signal, since both signals will pass through the signal combiner 24. In embodiments utilizing an attenuator, as well as in embodiments utilizing a filter, the logic controller can be configured to bypass the attenuator (or filter) at the signal processor 22 rather than deactivate the particular component.

The present disclosure should be considered as illustrative and not restrictive in character. It is understood that only certain embodiments have been presented and that all changes, modifications and further applications that come within the spirit of the disclosure are desired to be protected.

What is claimed is:

1. A combiner for receiving signals from multiple sources, including at least an over-the-air antenna for receiving one or more over-the-air signals, a cable television signal source (CATV source) and at least one satellite antenna, the combiner comprising:
    multiple inputs for connecting to each of the antenna, CATV source and at least one satellite;
    two or more outputs for coupling to a corresponding receiver;
    a printed circuit board including;
        a first signal combiner connected to the input for the over-the-air antenna and the CATV source and providing an output signal;
        a second signal combiner receiving the output signal from the first signal combiner and connected to the at least one satellite antenna to receive the satellite signal, and providing an output signal to the one or more outputs;
        a signal processor connected between the input for the over-the-air antenna and the first signal combiner and configured to operate on the antenna signal received at the input before the antenna signals reach the first signal combiner; and
        a logic controller connected between the input for the CATV source and the signal processor, the logic controller configured and operable to control the signal processor to operate on the antenna signal when a signal is detected at the input for the CATV source, and operable to control the signal processor to allow the antenna signal to pass to the first signal combiner when no signal is detected at the input for the CATV source, thereby controlling whether the over-the-air signal passes to the first signal combiner; and
    a power input for connecting the printed circuit board to a source of electrical power,
    wherein the printed circuit board includes a multi-switch connected between the second signal combiner and two or more of the outputs.

2. The combiner of claim 1, further comprising a power line connected between the power input and the input for the over-the-air antenna to provide electrical power to an antenna coupled thereto.

3. The combiner of claim 2, wherein the power line is integrated into the printed circuit board.

4. The combiner of claim 1, further comprising one or more amplifiers connected to corresponding ones of the one or more of the multiple inputs to amplify the signal received at the input.

5. The combiner of claim 4, wherein the one or more amplifiers are integrated into the printed circuit board.

6. The combiner of claim 1, in which the over-the-air antenna receives UHF, VHF and FM signals, the combiner further comprising:
    an FM output for an FM signal for connecting to an FM receiver; and
    a FM signal filter between the input connected to the antenna and the signal processor, and connected to the FM output, the FM signal filter operable to always pass the FM signal from the input to the FM output,
    wherein the signal processor is configured to only operate on the UHF and VHF signals from the over-the-air antenna.

7. The combiner of claim 6, wherein the FM signal filter is integrated into the printed circuit board.

8. A combiner, for receiving signals from multiple sources, including at least an over-the-air antenna for receiving one or more over-the-air signals, a cable television signal source (CATV source) and at least one satellite antenna, the combiner comprising:
    multiple inputs for connecting to each of the antenna, CATV source and at least one satellite;
    one or more outputs for coupling to a corresponding receiver;
    a printed circuit board including;
        a first signal combiner connected to the input for the over-the-air antenna and the CATV source and providing an output signal;
        a second signal combiner receiving the output signal from the first signal combiner and connected to the at least one satellite antenna to receive the satellite signal, and providing an output signal to the one or more outputs;
        a signal processor connected between the input for the over-the-air antenna and the first signal combiner and configured to operate on the antenna signal received at the input before the antenna signals reach the first signal combiner; and
        a logic controller connected between the input for the CATV source and the signal processor, the logic controller configured and operable to control the signal processor to operate on the antenna signal when a signal is detected at the input for the CATV source, and operable to control the signal processor to allow the antenna signal to pass to the first signal combiner when no signal is detected at the input for the CATV source, thereby controlling whether the over-the-air signal passes to the first signal combiner; and
    a power input for connecting the printed circuit board to a source of electrical power, wherein
    the signal processor is a switch operable in a closed state to allow passage of the antenna signal to the first signal combiner and operable in an open state to prevent passage; and
    the logic controller is operable to close or open the switch in response to the detection of a signal at the input for the CATV source.

9. A combiner, for receiving signals from multiple sources, including at least an over-the-air antenna for receiving one or more over-the-air signals, a cable television signal source (CATV source) and at least one satellite antenna, the combiner comprising:
    multiple inputs for connecting to each of the antenna, CATV source and at least one satellite;
    one or more outputs for coupling to a corresponding receiver;
    a printed circuit board including;
        a first signal combiner connected to the input for the over-the-air antenna and the CATV source and providing an output signal;
        a second signal combiner receiving the output signal from the first signal combiner and connected to the at least one satellite antenna to receive the satellite signal, and providing an output signal to the one or more outputs;

a signal processor connected between the input for the over-the-air antenna and the first signal combiner and configured to operate on the antenna signal received at the input before the antenna signals reach the first signal combiner; and a logic controller connected between the input for the CATV source and the signal processor, the logic controller configured and operable to control the signal processor to operate on the antenna signal when a signal is detected at the input for the CATV source, and operable to control the signal processor to allow the antenna signal to pass to the first signal combiner when no signal is detected at the input for the CATV source, thereby controlling whether the over-the-air signal passes to the first signal combiner; and a power input for connecting the printed circuit board to a source of electrical power, wherein the signal processor is a filter operable to filter the antenna signal; and the logic controller is operable to activate, deactivate or bypass the filter in response to the detection of a signal at the input for the CATV source.

10. A combiner for receiving signals from multiple sources, including at least an over-the-air antenna for receiving one or more over-the-air UHF, VHF and FM signals, a cable television signal source (CATV source) and at least one satellite antenna, the combiner comprising:

multiple inputs for connecting to each of the antenna, CATV source and at least one satellite;

one or more outputs for coupling to a corresponding receiver, including an FM signal output for connecting to an FM receiver;

a printed circuit board including;
  a first signal combiner connected to the input for the over-the-air antenna and the CATV source and providing an output signal;
  a second signal combiner receiving the output signal from the first signal combiner and connected to the at least one satellite antenna to receive the satellite signal, and providing an output signal to the one or more outputs;
  a signal processor connected between the input for the over-the-air antenna and the first signal combiner and configured to operate on the UHF and VHF signals received at the input for the antenna before the UHF and VHF signals reach the first signal combiner; and
  an FM signal filter connected between the input connected to the antenna and the signal processor, and connected to the FM output, the FM signal filter operable to always pass the FM signal from the input to the FM output; and a power input for connecting the printed circuit board to a source of electrical power, wherein the signal processor is configured to only operate on the UHF and VHF signals from the over-the-air antenna.

* * * * *